PRESS POWDERED ANODIZABLE METAL, FOR EXAMPLE TANTALUM, INTO POROUS PELLET

VACUUM SINTER THE PRESSED PELLET

ELECTROLYTICALLY TREAT PELLET IN AQUEOUS SOLUTION OF COMPOUND, FOR EXAMPLE MANGANOUS NITRATE, WHICH IS CAPABLE OF PYROLYTIC CONVERSION INTO A SEMICONDUCTIVE METAL OXIDE.

EFFECT PYROLYTIC CONVERSION OF MANGANOUS NITRATE WITHIN PELLET PORES TO MANGANESE OXIDE BY HEATING PELLET ABOUT 1 MINUTE AT 500°C.

REPEAT FOUR TIMES THE CYCLE OF ANODIZING PELLET IN MANGANOUS NITRATE SOLUTION AND PYROLYTICALLY CONVERTING THE IMPREGNATED MANGANOUS NITRATE WITHIN THE PELLET PORES TO MANGANESE OXIDE

ANODIZE PELLET IN DILUTE MANGANOUS NITRATE SOLUTION

DRY PELLET BY HEATING IN AIR 15 MINUTES AT 110°C.

DEPOSIT CONDUCTIVE COATING OVER PELLET

INVENTOR.
EDWARD J. SHERMAN
BY
*Ws. Hief*
AGENT

United States Patent Office
3,100,329
Patented Aug. 13, 1963

3,100,329
SOLID CAPACITORS
Edward J. Sherman, Somerville, N.J., assignor to Radio Corporation of America, a corporation of Delaware
Filed Mar. 24, 1960, Ser. No. 17,321
4 Claims. (Cl. 29—25.31)

This invention relates to an improved method of fabricating solid electrolytic capacitors. More particularly, it relates to an improved method of forming dielectric films on anodizable electrodes.

Solid electrolytic capacitors have been made by electrolytically anodizing a body of an anodizable metal such as aluminum and the like. A thin film is thereby formed over the surface of the body. The film, which consists of the oxide of the particular metal, serves as the dielectric of the completed unit. It has been found desirable to cover the dielectric film with a protective layer of a semiconductive metal oxide such as lead oxide, nickel oxide, manganese oxide, and the like. This protective semiconductive oxide layer serves to reoxidize and heal the dielectric film in case of puncture of local breakdown of the film.

In one method of fabricating capacitors, a powdered anodizable metal is pressed to form a porous body or pellet. The body or compact thus formed has considerable surface area but is rather frangible and mechanically weak. The body is therefore sintered at a temperature below the melting point of the particular anodizable metal, thereby forming a pellet which has good mechanical strength and retains a high degree of porosity. The sintered pellet is immersed in a bath containing a conductive electrolyte and an inert electrode such as graphite, platinum, and the like. According to the prior art, the electrolyte may for example consist of dilute phosphoric or sulfuric acid, or an aqueous solution of a halogen-substituted acetic acid, or a solution of ammonium borate in a glycol such as ethylene glycol. Fused low-melting salts, such as mixtures of potassium nitrate, sodium nitrate, and the like, have also been utilized as the electrolyte. The pellet is made the anode of the bath, and a current is passed from the pellet through the electrolyte to the inert electrode, which serves as the bath cathode. During this step, which is known as the forming step, a thin dielectric film consisting of the oxide of the anodizable metal is formed over the surface of the pellet, and also on the internal surface of the pellet pores. Thereafter the pellet is removed from the electrolyte, washed five times with boiling distilled or deionized water, dried, and dipped in a solution of a compound such as manganous nitrate which is capable of pyrolytic conversion to a semiconductive metal oxide layer. The solution impregnates the pellet pores, so that on subsequent heating a protective layer of manganese oxide is formed over the pellet and within the pellet pores in close contact to the dielectric film. The pellet is anodized again, rinsed five times with boiling distilled or deionized water, dried, again impregnated with the manganous nitrate solution, and again heated to convert the compound impregnated in the pellet pores to the protective manganese oxide layer. This cycle of anodizing the pellet, washing the pellet five times in boiling distilled or deionized water, drying the pellet, impregnating the pellet with a compound capable of pyrolytic conversion to a semiconductive metal oxide, and heating the wafer to effect the pyrolytic conversion of the impregnated compound to a protective metal oxide layer, is usually repeated about 4 or 5 times. Thereafter a conductive coating is applied over the protective metal oxide layer, leads are attached to the bulk of the pellet and to the conductive coating, and the unit is cased.

A serious problem in this process is that the electrolytes mentioned above cannot be removed completely from the porous pellet by rinsing. The small amount of electrolyte left within the pellet pores degrades the electrical properties of the dielectric film by hampering the action of the semi-conductive protective metal oxide layer. Since the pellet is recycled several times between the electrolyte and the impregnating solution, and is rather porous in nature, it is very difficult to prevent the pellet from retaining some of the electrolyte within its pores. In order to avoid degradation of the finished capacitors, it has been necessary to utilize very careful and prolonged washing and rinsing of the pellet after it is removed from the forming bath electrolyte. In practice it has been necessary to wash the pellet 5 times after each immersion in the forming bath, each washing step being performed for about two minutes in a separate vat of boiling deionized water. Inasmuch as the cycle of anodizing, impregnating, and heating the pellet is usually repeated five times, the total time spent in washing the wafer twenty-five times in boiling water is about one hour. Thus the necessity of carefully washing the pellet after each immersion in the electrolyte causes a considerable increase in the manufacturing time, the amount of handling required, and the cost per unit.

Another problem in this process is that simple immersion of the pellet in the manganous nitrate solution does not completely impregnate the pellet pores with the solution. For this reason, it has been common practice to use vacuum or pressure impregnation of the manganous nitrate solution. This practice requires additional handling steps, as well as special equipment such as pumps and valves.

Accordingly, it is an object of this invention to provide an improved method of fabricating solid electrolytic capacitors.

Another object of this invention is to provide an improved method of forming dielectric films on anodizable electrodes.

Another object is to provide a method of simultaneously forming a dielectric film on an anodizable electrode surface and impregnating the electrode with a compound capable of pyrolytic decomposition into a protective semiconductive oxide.

These and other objects are accomplished by the instant invention in the following manner. A powdered anodizable metal is pressed into a porous pellet. The pellet is vacuum sintered, then electrolytically treated in an aqueous solution of a compound capable of pyrolytic conversion into a semiconductive metal oxide. The pellet is thus anodized, and simultaneously the pellet pores are impregnated with the compound. Subsequently, the wafer is heated so as to convert the compound within the pellet pores into a semiconductive metal oxide. The steps of anodizing the pellet and pyrolytically converting the impregnated compound within said pores into the semiconductive oxide is usually repeated at least once. However, it is no longer necessary to wash the wafer after each anodization, since the same compound used as the electrolyte in the forming bath is used to impregnate the metal pores and form a protective semiconductive layer by pyrolytic action. Another advantage is the reduction in the number of handling steps and manufacturing time per unit, since anodization and impregnation is combined in a single step. To complete the unit, a conductive coating is deposited upon the pellet. Lead wires are then attached to the pellet and the conductive coating, and the unit is cased by methods known to the art.

The invention and its advantages will be described in greater detail by the following examples and the accompanying drawing, in which the single FIGURE is a flow sheet illustrative of the various steps in one embodiment of the process.

Example I

A quantity of a powdered anodizable metal is pressed into a porous slug or pellet. The anodizable metal is selected from the group consisting of aluminum, beryllium, columbium, hafnium, tantalum, titanium, tungsten, zirconium, and the like. In this example, the metal is powdered tantalum, and the tantalum particles have a diameter of about 2 to 4 microns. An anode lead is provided by embedding in the powder a tantalum ribbon about 3 mils thick, 25 mils wide, and ½ inch long. A pressure of about 5 tons per square inch is used to press the powder into a slug or pellet about 180 mils square and 10 mils thick.

The pressed pellet is vacuum sintered by heating it for 20 minutes in a vacuum furnace kept at 1750° C. The atmospheric pressure in the furnace is maintained below 1 micron Hg during this step.

The next step is known as the forming step. The pellet is immersed in a forming bath which contains an electrolyte. According to this invention, the electrolyte preferably is an aqueous solution of a compound selected from the hydroxides, nitrates, acetates, oxalates and formates of lead, nickel, and manganese. In this example, the electrolyte is an aqueous solution of manganese nitrate, containing about 58% by weight of the solute. The electrolyte is contained in a stainless steel tank, which serves as the cathode of the bath. The pellet is anodized by passing a direct current from the pellet through the electrolyte to the steel tank. The voltage applied ranges from about 10 to 60 volts, depending on the thickness of the anodized film desired. The higher the voltage used, the thicker the resulting film and the lower the capacitance of the finished unit. In this example, the forming voltage is about 60 volts, and the pellet is electrolytically treated in the bath for about 1½ hours. During this step a thin colored dielectric film of tantalum oxide forms over the pellet surface. The film may be violet, blue, or any of the interference colors depending upon film thickness, and may vary in thickness from about 200 Angstroms to 2000 Angstroms, depending on the applied voltage and the time it is applied.

The pellet is now heated in air for about one minute at 500° C. to effect the pyrolytic conversion of the manganese nitrate within the pellet pores to manganese oxide. During this step the manganous nitrate within the pellet pores decomposes, giving off fumes of nitric oxide. A non-volatile residue of manganese oxide is left, which closely covers and adheres to the dielectric tantalum oxide film.

The pellet is now ready for a repetition of the cycle of anodization followed by pyrolytic conversion of the impregnated compound to the protective metal oxide. Anodization is again accomplished in an electrolyte consisting of aqueous manganous nitrate solution. The bath containing 58% by weight manganous nitrate solution, which was used in the first anodization, may be used in the subsequent anodization steps. However, the voltage applied during all anodization steps after the first step is preferably lower than the voltage applied during the first forming step, in order to avoid increasing the thickness of the dielectric film. In this example, all the subsequent anodization steps are accomplished by applying a voltage of about 45 volts for about 45 minutes to the pellet in the forming bath.

An important feature of this invention is that the prolonged and careful washing of the pellet required in the prior art is not necessary, since a solution of the same compound is used for the various anodization steps and impregnation steps. Another feature is that the impregnation of the electrolyte compound solution within the pellet pores is more thorough than that obtained by merely immersing the pellet in a solution, since in effect the compound is driven into the pellet pores by the applied voltage. Since impregnation is thus improved, the number of anodization and pyrolysis cycles required is reduced about 30%. Still another feature is that no harmful residue can be retained in the pellet pores, since only the solution desired for pyrolytic conversion to the protective layer is present within the pellet pores.

The cycle of anodization followed by pyrolytic conversion is usually repeated at least once. In this example, the cycle is repeated four times. Advantageously, a last anodization is performed in a very dilute manganous nitrate solution, for example a solution containing about .01 weight percent or less dissolved solute. Very little manganous nitrate is introduced into the pellet pores during this step, since the electrolyte solution is so dilute. The pyrolysis step is now omitted, but the unit is oven dried 15 minutes at 110° C.

A conductive coating is now applied to the pellet surface by dipping it in a suspension of finely divided graphite. The graphite suspension commercially available as Aquadag is suitable for this purpose. To insure a good uniform coating, the pellet is oven dried and the cycle of dipping in a graphite suspension and drying the wafer is repeated. A conductive graphite coating is thus formed over the pellet surface.

Next, an electrically conductive silver-loaded epoxy resin is sprayed over the graphite coating. A cathode lead is formed by cementing a nickel ribbon to the conductive resin layer with the same epoxy resin. This nickel ribbon forms an electrical contact through the conductive resin layer and the conductive graphite layer to the protective manganese oxide layer which covers the dielectric tantalum oxide film. The unit is then cased by methods known to the art.

An example of another embodiment of the invention will now be described. This embodiment is useful when it is desirable to utilize forming voltages greatly in excess of 60 volts. High forming voltages are preferred for the production of units which have lower capacity ratings (i.e., thicker dielectric films). It has also been found that the voltage rating of finished capacitor units is directly related to the forming voltage during the fabrication of the units, hence capacitors intended to exhibit a high voltage rating are anodized at high voltages.

Example II

A quantity of a powdered anodizable metal is formed into a porous pellet about 180 mils square and 10 mils thick by applying a pressure of about 450 pounds to the powder. In this example, the anodizable metal is columbium. The pellet is vacuum sintered at 1500° C. for 15 minutes. An anode lead is formed by spot welding to the pellet a columbium ribbon about 3 mils thick, 25 mils wide, and ½ inch long. The pellet is then resintered at 1500° C. for 15 minutes.

The pellet is now placed in a forming bath, which in this example contains an aqueous solution of nickel nitrate as the electrolyte. Since it is desired to perform the first anodization at a high voltage, a dilute solution of the electrolyte is employed for the first forming step, as concentrated electrolyte solutions tend to break down at high voltages. In this example, the aqueous electrolyte utilized in the first forming step contains about .01 weight percent nickel nitrate. As in the previous example, the electrolyte is contained in a stainless steel tank which serves as the cathode of the bath. The pellet is anodized by passing a direct current from the pellet through the electrolyte to the steel tank. In this example, the first anodization is performed at 180 volts for 90 minutes. A dielectric film of columbium oxide is thereby formed over the pellet. The unit is now dried by heating it in air for 15 minutes at 110° C.

Next, the pellet is immersed in a saturated aqueous solution of nickel nitrate, and reformed by the application of 50 volts for 30 minutes. During this step the pellet pores become impregnated with nickel nitrate. The pellet is then heated about one minute at 450° C. to effect the pyrolytic conversion of the impregnated nickel nitrate to a protective layer of nickel oxide which is in close contact with the dielectric columbium oxide film.

The above cycle of reforming the pellet at 50 volts in the saturated electrolyte followed by pyrolyzing the impregnated nickel nitrate so as to convert it to nickel oxide is repeated four times. Advantageously, a last anodization is performed for 30 minuts at 50 volts in a dilute nickel nitrate solution. The last anodization may be performed in a solution containing about .01 weight percent nickel nitrate, such as that used in the initial forming step. After this last reform the pyrolysis step is omitted and the pellet is oven dried 15 minutes at 110° C.

A conductive coating is now applied to the pellet surface. The coating may for example consist of graphite, applied in the manner described above in Example I. Next, a portion of the wafer adjacent to the anode lead is masked, and the remainder of the pellet sprayed with 60 tin—40 lead solder. A cathode lead is formed by soldering a gold plated nickel ribbon to the solder coated area of the pellet. The gold plated ribbon forms an electrical contact through the solder and the conductive graphite to the layer of nickel oxide which covers the dielectric columbium oxide film. The unit is then cased by methods known to the art.

It will be understood that the above examples were by way of illustration only, and not as limitations. Many modifications may be made in the process without departing from the spirit and scope of the instant invention. For example, any of the other anodizable metals may be utilized, such as titanium and the like. Other semiconductive metal oxides such as lead oxide may be utilized for the protective layer over the dielectric film. The electrolyte may be any compound of lead, nickel, or manganese which is readily pyrolyzed and leaves a residue consisting of the oxide of lead, nickel, or manganese.

What is claimed:

1. The method of forming a solid electroyltic capacitor comprising the following steps: pressing a powdered anodizable metal into a porous pellet; vacuum sintering said pellet; electrolytically treating said pellet in a concentrated aqueous solution of a compound capable of pyrolytic conversion into a semiconductive metal oxide so as to simultaneously anodize said pellet and impregnate the pellet pores with said compound; heating said wafer so as to convert said compound, which has been thus electrolytically introduced, in said pellet pores into a stmiconductive metal oxide; repeating at least once the steps of anodizing said pellet and pyrolytically converting the impregnated compound within said pores into said semiconductive metal oxide; and depositing a conductive coating upon said pellet.

2. The method of fabricating a solid electrolytic capacitor comprising the following steps: pressing a powdered anodizable metal into a porous pellet, said metal being selected from the group consisting of aluminum, beryllium, columbium, hafnium, tantalum, tungsten, and zirconium; vacuum sintering said pellet; electrolytically treating said pellet in a concentrated aqueous solution of a compound capable of pyrolytic conversion into a semiconductive metal oxide so as to simultaneously anodize said pellet and impregnate the pellet pores with said compound; heating said wafer so as to convert said compound, which has been thus electrolytically introduced, in said pellet pores into a semiconductive metal oxide; repeating at least once the steps of anodizing said pellet and pyrolytically converting the impregnated compound within said pores into a semiconductive metal oxide; and depositing a conductive coating upon said pellet.

3. The method of forming a solid electrolytic capacitor comprising the following steps: pressing a powdered anodizable metal into a porous pellet; vacuum sintering said pellet; electrolytically treating said pellet in a concentrated aqueous solution of a compound capable of pyrolytic conversion into a semiconductive metal oxide selected from the group consisting of lead oxide, nickel oxide, and manganese oxide so as to simultaneously anodize said pellet and impregnate the pellet pores with said compound; heating said wafer so as to convert said compound, which has been electrolytically introduced, in said pellet pores into a semiconductive metal oxide; repeating at least once the steps of anodizing said pellet and pyrolytically converting the impregnated compound within said pores into a semiconductive metal oxide; and depositing a conductive coating upon said pellet.

4. The method of fabricating a solid electrolytic capacitor comprising the following steps: pressing a powdered anodizable metal into a porous pellet; vacuum sintering said pellet; electrolytically treating said pellet in a concentrated aqueous solution of a compound selected from the group consisting of the hydroxides, nitrates, acetates, oxalates, and formates of lead, nickel, and manganese so as to simultaneously anodize said pellet and impregnate the pellet pores with said compound; heating said wafer so as to convert said compound, which has been electrolytically introduced, in said pellet pores into a semiconductive metal oxide; repeating at least once the steps of anodizing said pellet and pyrolytically converting the impregnated compound within said pores into a semiconductive metal oxide; and depositing a conductive coating upon said pellet.

References Cited in the file of this patent

UNITED STATES PATENTS

| | | |
|---|---|---|
| 2,299,228 | Gray et al. | Oct. 20, 1942 |
| 2,936,514 | Millard | May 17, 1960 |